Jan. 30, 1945.    J. C. SMITH    2,368,169
APPARATUS FOR PRESIZING GLASS TUBING
Filed Dec. 10, 1941    5 Sheets-Sheet 2
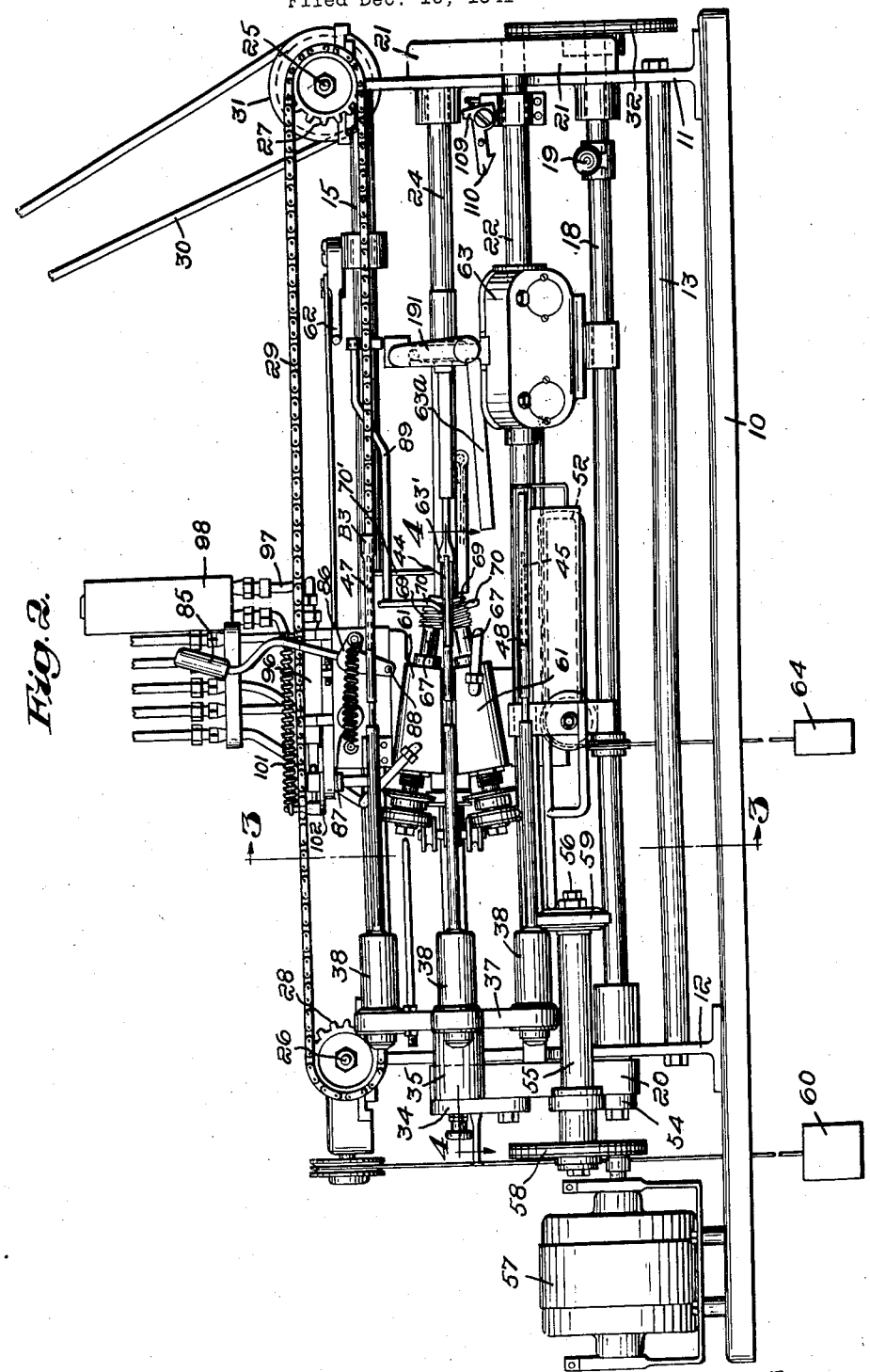
Inventor:
Jesse Conrad Smith,
by Spear, Rawlings & Spear.   Attorneys

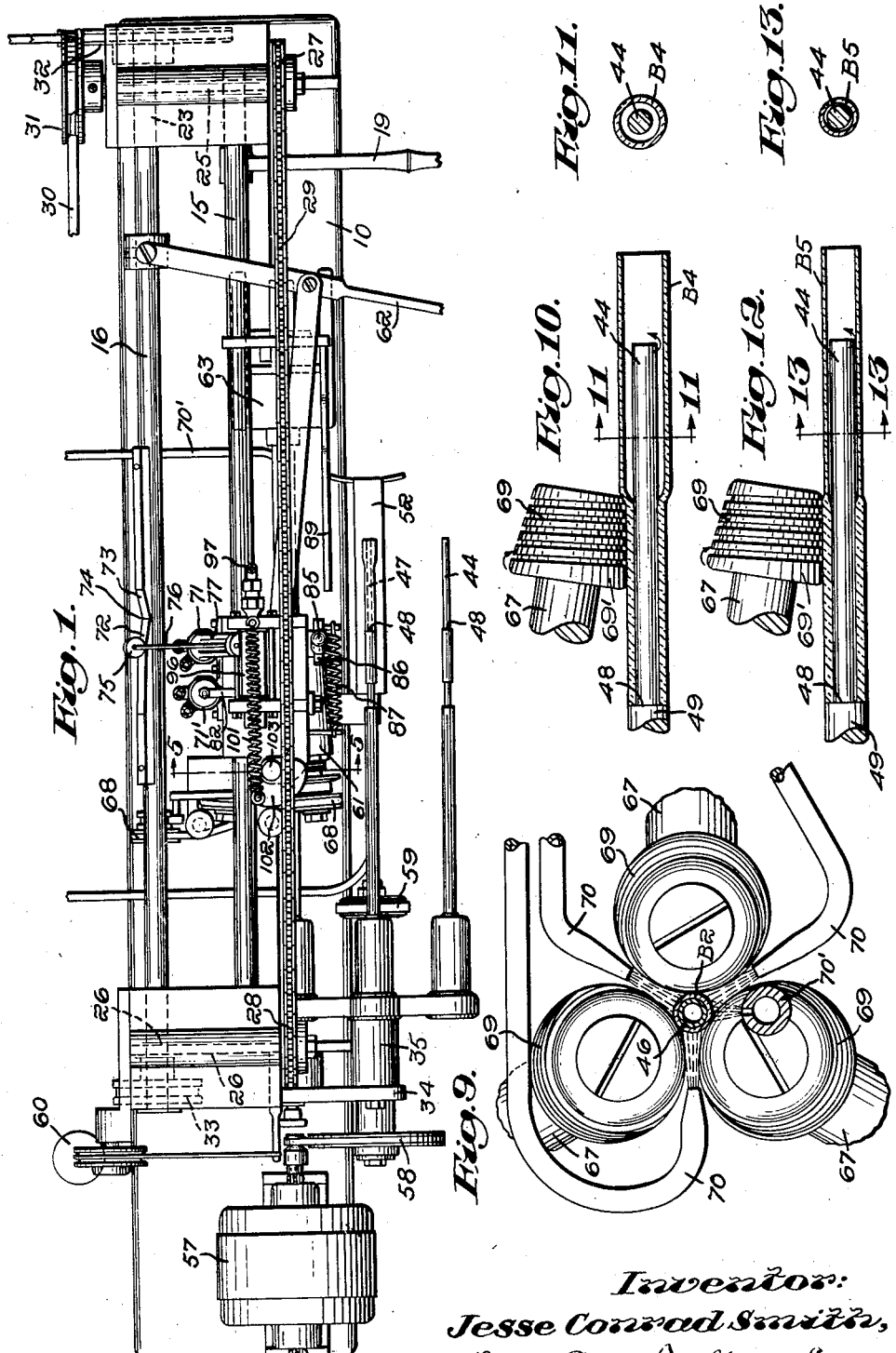

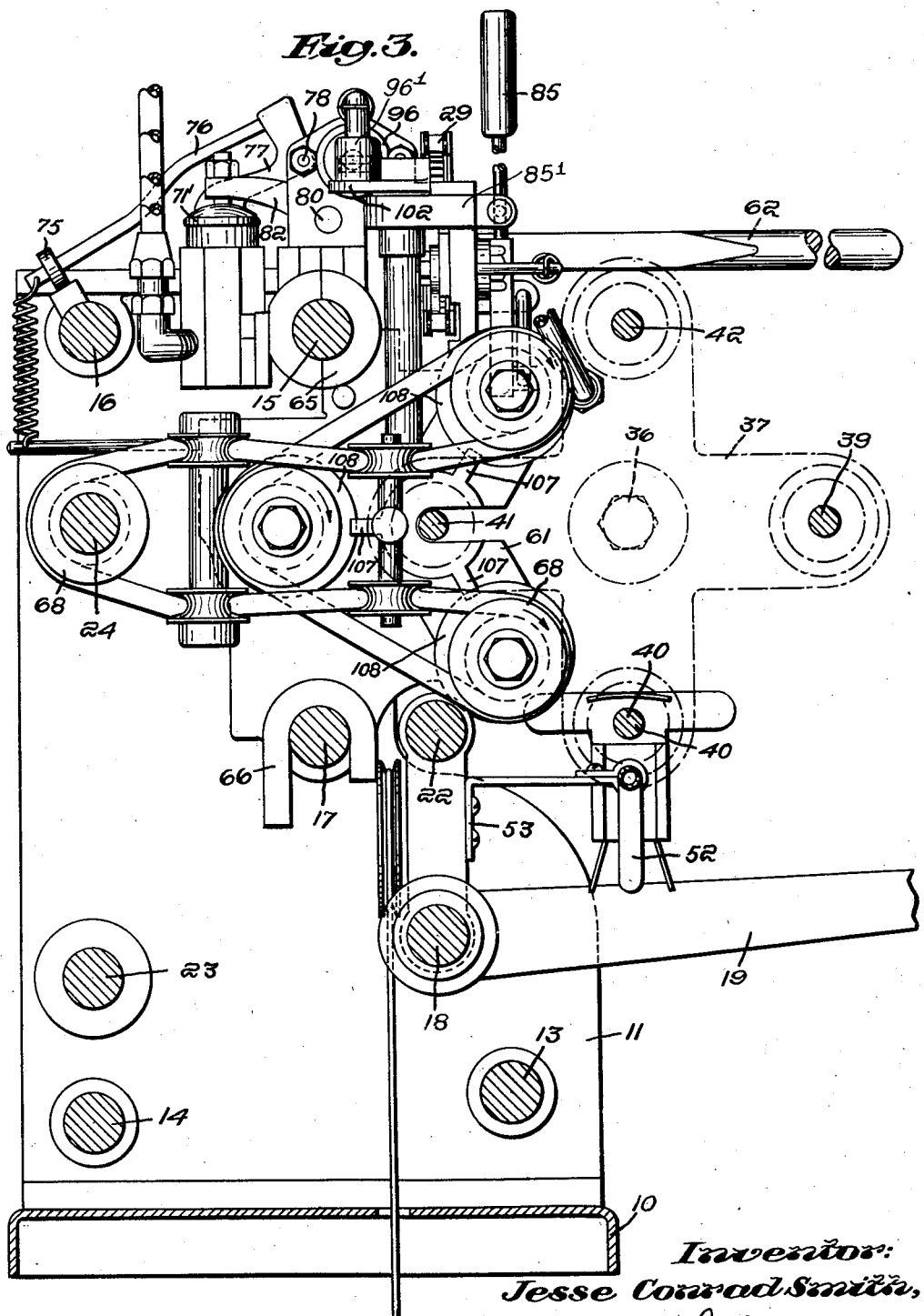

Jan. 30, 1945. J. C. SMITH 2,368,169
APPARATUS FOR PRESIZING GLASS TUBING
Filed Dec. 10, 1941 5 Sheets-Sheet 4
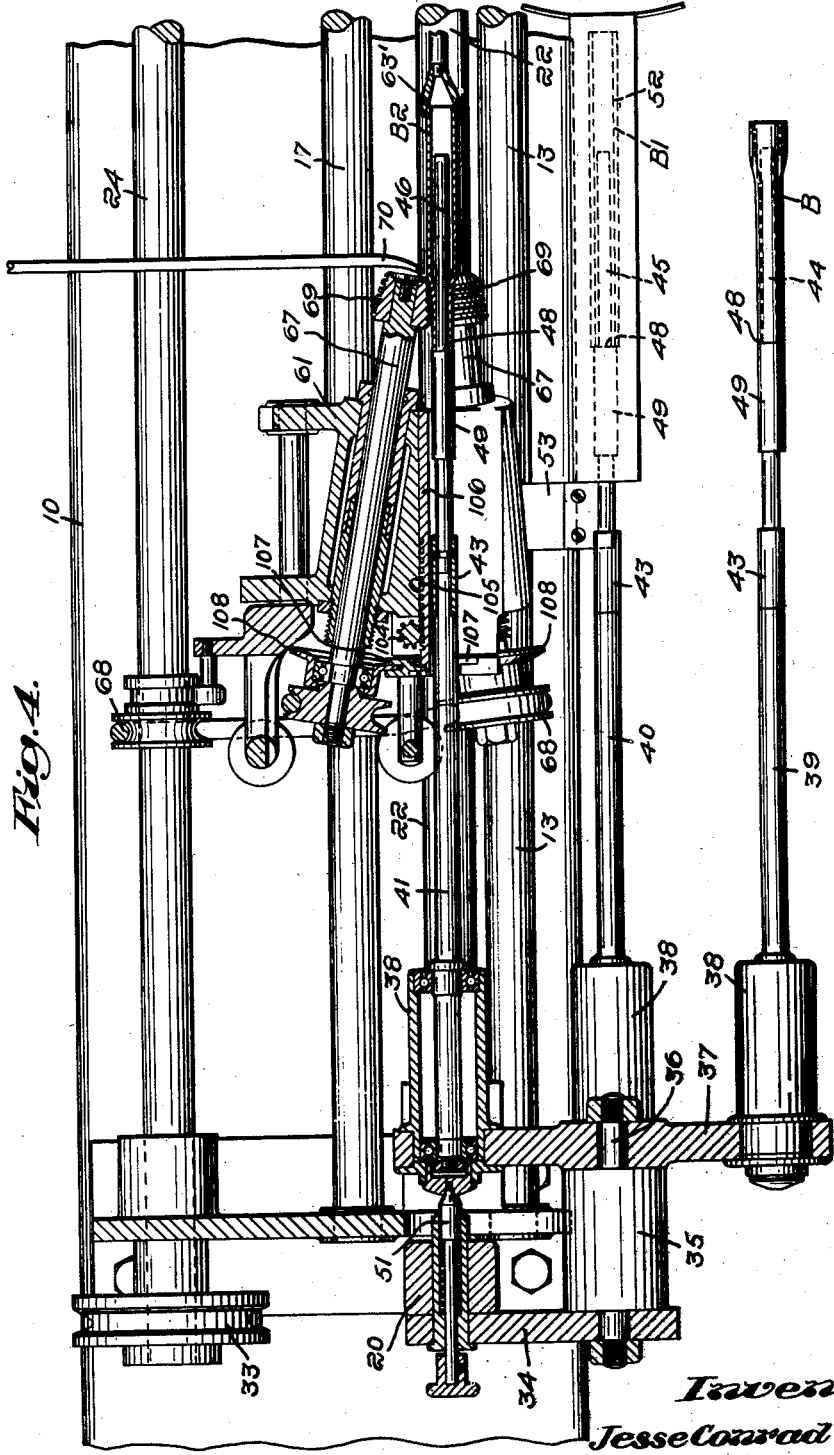

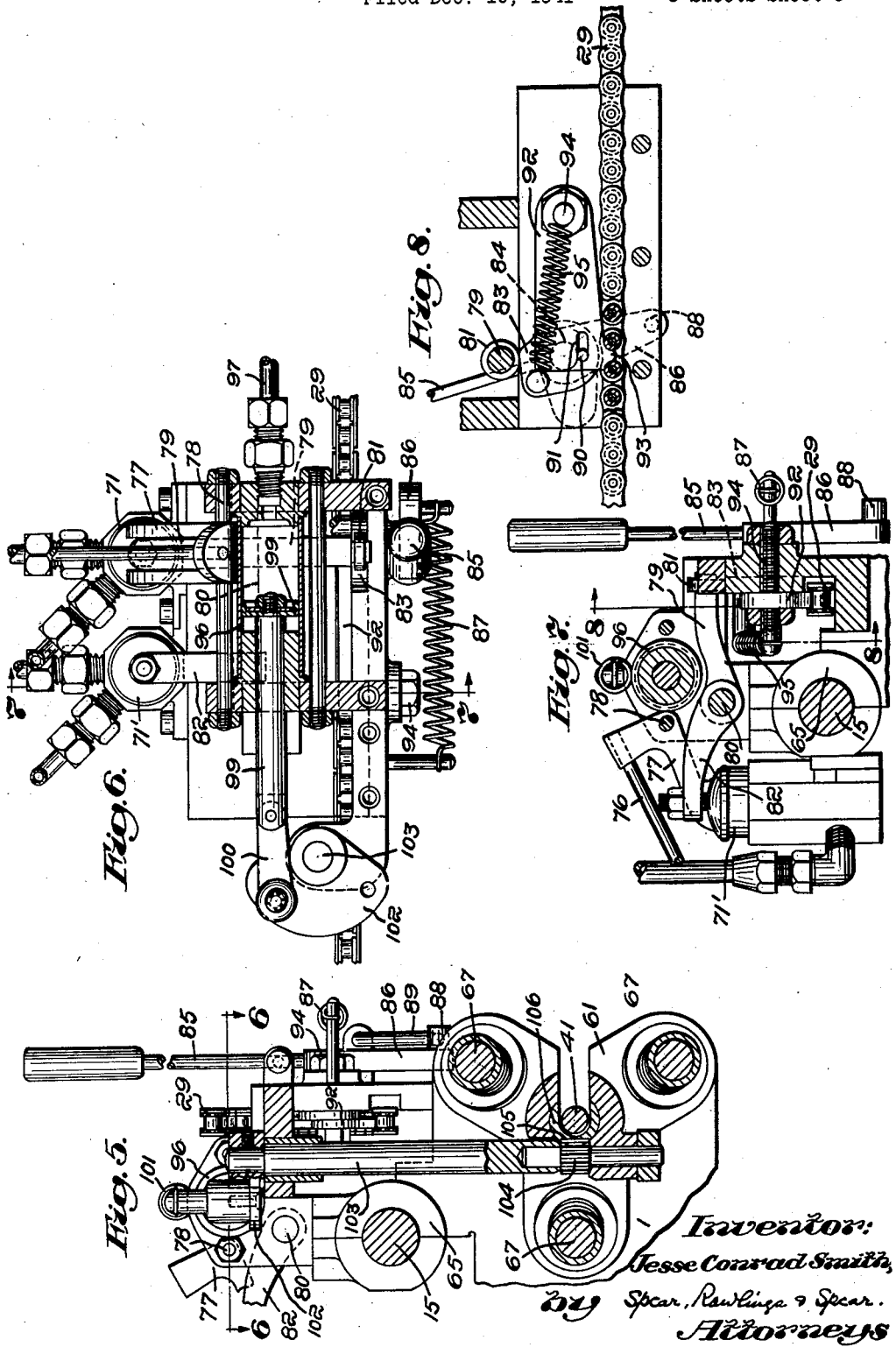

Patented Jan. 30, 1945

2,368,169

UNITED STATES PATENT OFFICE 2,368,169

APPARATUS FOR PRESIZING GLASS TUBING

Jesse Conrad Smith, Merrick, N. Y., assignor to MacGregor Instrument Company, Needham, Mass., a corporation of Massachusetts Application December 10, 1941, Serial No. 422,412

11 Claims. (Cl. 49—7)

This invention relates to apparatus for presizing random-sized glass tubing, and has for its general object to produce from such tubing cylindrical and/or tapered tubes of substantially uniform diameter. From such uniformly sized tubes a wide variety of articles having closely fitting relatively movable parts may be fabricated, of which the barrel and plunger of a hypodermic syringe, the shell and rotary valve of a stop cock, and the tapered tubes used in flow meters, are typical examples.

In carrying out my invention, I subject random-sized glass tubing to a series of fire-sizing operations which brings the tubes to the precise internal and external diameters wanted.

I do this by placing a preheated blank of glass tubing upon an arbor of a certain size and then rotating the blank and arbor between three sizing rolls that are equally spaced from the center of the arbor. While rotating the blank and arbor I apply heat in a narrow band to the blank to soften the same and simultaneously compress the blank from one end, thereby upsetting the glass. When the glass is upset there is no resistance either inside or outside of the blank and hence the glass will continue to expand so long as it is being heated and rotated. When the heat is discontinued or when the glass expands to the point where it contacts either the arbor or the sizing rolls, the inside and outside diameters of the blank cease to change and there is produced an enlarged glass portion which is also constricted to arbor diameter. By progressively moving the fires and the sizing rolls as a unit along the softened blank this enlarged portion or ring is converted into a tube of greater diameter than it was originally and its inside is uniformly given the same diameter as the arbor.

In the sizing process, the inside diameter of the blank, whether the same be greatly or only slightly larger than that of the arbor, is reduced to the exact arbor diameter, and the outside diameter of the blank is changed as wanted from a larger to a smaller diameter, or from a smaller to a larger diameter, than that of the original blank.

Tubes presized in accordance with my invention to a wanted diameter are characterized in that any variations in their diameters may be held to tolerances of plus or minus .008 of an inch, which for most purposes is close enough to justify classifying them as of uniform diameter.

My machine includes an indexing work holder having a plurality of spaced longitudinally extending blank-supporting arbors. The work holder is pivoted to the machine frame to swing laterally relative thereto from an inward operating position to an outward non-operating position.

Slidable longitudinally on the machine frame is a sizing unit having a plurality of equidistantly spaced sizing rolls and a plurality of burners disposed between and traveling with said rolls, and an independent end-pressure unit for exerting end pressure on a blank centered between said sizing rolls.

When the work holder is manually swung inwardly into operating position, one arbor with a blank thereon is being preheated, another arbor with a preheated blank thereon is entered axially between the sizing rolls so as to be alined with the end-pressure unit, while other arbors, with sized blanks thereon, are cooling.

With the work holder thus positioned, the sizing rolls and burners are fed through a working stroke which causes them to traverse the preheated blank in one direction substantially from end to end thereof and the end pressure device, which has been brought up against the outer end of said blank, is simultaneously fed through a working stroke in the opposite direction to cause it to continuously follow up the blank as its length decreases under the softening action of the traveling flames and the sizing action of the sizing rolls.

The sizing rolls are rotated at predetermined surface speed during the working stroke of the sizing unit. At the beginning of such stroke they are also moved longitudinally relative to their carriage a distance sufficient to bring them into contact with the preheated blank so as to rotate it and its arbor throughout the working stroke of the sizing unit.

Appropriate mechanism is provided for automatically discontinuing the feed of the sizing unit at the completion of its working stroke; for turning on and shutting off the fuel supply to the traveling burners in properly timed relationship to the operation of the sizing unit; and for restoring the sizing and end pressure units after they have completed their working strokes, at which time the work holder is manually swung outwardly into non-operating position so that a sized and cooled blank may be withdrawn from one arbor and replaced with a new blank, after which the work holder is manually indexed one step ahead and swung back into operating position.

The combined action of the sizing rolls, the traveling burners, the rotating arbor, and the end-pressure device is to establish the inside and outside diameters of the preheated glass blank. In this action, the traveling burners progressively soften relatively narrow bands or zones of the blank, and the end-pressure device causes the glass at the heated zone to expand outwardly against the sizing rolls and also to contract against the arbor. As a result, the diameter of the blank is increased on the outside and decreased on the inside to the required dimensions, as determined by the arbor and sizing rolls. Consequently, any variations in diameter which existed in the random-sized commercial blanks are eliminated, and the finished tubes are all brought to a definite and uniform standard or dimension which adapts them for efficient fabrication into wide variety of commercial articles.

In the accompanying drawings:

Fig. 1 is a top plan view of a presizing machine embodying the principles of my invention, the traveling burner unit at the top of the machine being omitted for clarity of illustration.

Fig. 2 is a front elevation of such machine and showing the traveling burner unit.

Figs. 3 and 4 are vertical and plan sections on the lines 3—3 and 4—4, respectively, of Fig. 2.

Fig. 5 is a vertical section on the line 5—5, of Fig 1.

Fig. 6 is a horizontal section on the line 6—6, of Fig. 5.

Fig. 7 is a vertical section on the line 7—7, of Fig. 6.

Fig. 8 is a vertical section on the line 8—8, of Fig. 7.

Fig. 9 is an end view on an enlarged scale showing the rolls of the sizing unit at work.

Fig. 10 is a diagram showing a blank of original large outside diameter being sized to a predetermined dimension.

Fig. 11 is a section on the line 11—11, of Fig. 10.

Fig. 12 is a view similar to Fig. 10 but showing a blank of original small outside diameter being sized to a predetermined dimension, and Fig. 13 is a section on the line 13—13, of Fig. 12.

The machine frame includes a horizontal bed 10 and end uprights 11 and 12. Extending between the end uprights is a pair of lower tie rods 13 and 14, a pair of upper tie rods 15 and 16, and an intermediate tie rod 17 (Fig. 3).

Journaled in said end uprights adjacent the front side of the machine is a rock shaft 18 having a manually operable lever 19. Fast to the ends of rock shaft 18 are rocker arms 20 and 21 to which the ends of a guide rod 22 are secured (Fig. 2).

Journaled in said end uprights adjacent the rear side of the machine is a drive shaft 23 and a superimposed driven shaft 24.

Journaled transversely of the end uprights at their upper ends is a pair of sprocket shafts 25 and 26. Each sprocket shaft carries a sprocket 27 and 28 over which a sprocket chain 29 is trained. (Figs. 1 and 2.)

Power is applied to the sprocket shaft 25 in any suitable manner. As shown in Fig. 2, it is applied through belt 30 and pulley 31, but it may be applied by a motor and reduction gearing.

Power is applied to drive shaft 23 in any suitable manner as by pulley 32, and shaft 24 is driven from drive shaft 23 in any suitable manner, as by the belt and pulley drive 33 at the left hand end of the machine (Fig. 1).

Extending towards the front side of the machine from the rocker arm 20 at the left hand end of the machine is a bracket 34 having a bearing 35 (Fig. 4) in which is journaled for free rotation a stud 36. Fast to said stud is a longitudinally extending work-holder comprising a four-arm spider 37 having four equidistantly spaced bearings 38. Journaled in said bearings 38 are spindles 39, 40, 41 and 42. The outer ends of the spindles are reduced to receive sleeves 43 within which are entered and held in any suitable manner, as by pinning, the reduced inner ends of a plurality of arbors 44, 45, 46 and 47.

Each arbor is shouldered between its ends as at 48 and such shoulders constitute fixed stops against which the inner ends of the glass blanks B, B', B² and B³ abut when endwise inserted over said arbors from the right in Fig. 1. A portion 49 of each arbor lying inwardly of each shoulder 48 is a friction surface for engagement by the sizing portion 69' of the sizing rolls 69 of the sizing unit, as hereinafter explained, whereby each arbor may be rotated at stated times. Such friction surface 49 is carefully machined to the exact outside diameter to be given to the glass blank, and may therefore be considered to have the function of a sizing roll. The portion of each arbor lying outwardly of each shoulder 48 is a supporting surface for the blank.

The arbors are constructed of a material which is not only resistant to the high temperatures employed to soften the glass tubing, but which when heated to or above the softening point of the glass will not objectionably adhere to the glass and prevent subsequent removal of the sized blank therefrom. For such arbors I prefer to use an alloy having a coefficient of expansion slightly greater than that of the glass.

The work holder is adapted to be rocked laterally relative to the machine about shaft 18 as an axis by means of hand lever 19 from a closed operative position to an open inoperative position, and vice versa. A suitable detent as the manually retractable spring-controlled locking pin 51 (Fig. 4) is provided for locking the work holder in operative position, such pin successively engaging in holes in the adjacent ends of the spindle heads as the work holder is indexed one-quarter turn after each opening and closing movement thereof.

When the work holder is in operative position, each arbor is supplied with a glass blank. Referring to Fig. 4, blank B' on arbor 45 is being preheated, blank B² on arbor 46 is being sized, and blanks B and B³ on arbors 44 and 47 have been sized in preceding steps of the work holder cycle and are now cooling. Blank B on arbor 44 has in fact sufficiently cooled so that it may be removed from its arbor and replaced by an untreated blank when the work holder is swung forwardly to its inoperative position by means of hand lever 19.

With the work holder in operative position, the untreated blank B' on arbor 45 is preheated uniformly throughout its length by means of a subjacent stationary flame supplied, preferably, by a constantly burning ribbon burner 52 (Fig. 4) supported as by bracket 53 on rock shaft 18 so as to follow the swinging movements of the work holder. The flame delivered by preheating burner 52 is not high enough appreciably to soften the glass, but is high enough to warm it and its arbor to a condition best suited for the sizing operation which follows when the work holder is indexed one step ahead to bring the preheated blank into the range of action of the sizing unit.

In order to insure uniformity of preheating throughout the entire length of the blank and in all areas thereof, I prefer to rotate the preheating arbor and its blank at a suitable surface speed relative to said burner 52. Conveniently, this may be done by extending forwardly from the rocker arm 20 a bracket 54 (Fig. 2) having a bearing 55 for a spindle-driving shaft 56. Shaft 56 swings outwardly and inwardly with the work holder, and is constantly rotated in any suitable manner as by motor 57 and pulley and belt drive 58. Motor 57 is fast to bed 10 and its shaft is aligned with rock shaft 18. Fast on shaft 56 is a friction roller 59 which when the work holder has been swung inwardly to its operating position frictions against the adjacent surface of whichever spindle has been stepped into position to function as the preheating spindle.

Preferably, the work holder is counterbalanced as at 60 to make it easier for the operator to swing the same to and from operating position.

Upon stepping the work holder one-quarter turn clockwise in Fig. 3 and returning it to operating position, the preheated blank is automatically brought into position to be acted upon by the sizing rolls 69 and end-pressure device 63.

The sizing rolls 69 are mounted on a longitudinally reciprocable carriage 61 which is automatically fed by means of chain 29 from a starting position adjacent the left hand end of the machine through an operating stroke which causes it to traverse the entire length of the preheated blank. The carriage 61 is manually returned to original position at the completion of its working stroke by means of a hand operator lever 62.

Associated with the sizing unit is the longitudinally reciprocable pressing unit 63 for exerting end pressure on the outer end of the blank being sized. End pressure unit 63 is mounted on guide rod 22 and guides on rock shaft 18 to follow the swinging movements of the work holder. It is automatically fed longitudinally along guide rod 22 but in opposite direction to the working stroke of carriage 61, in any suitable manner, as by means of a weight 64 or an equivalent spring feed. In its starting position it lies towards the right hand end of the machine and moves through an operating stroke towards the left hand end of the machine. It is manually returned at the completion of its working stroke by the operator grasping it with her hand and sliding it back to original position. Said unit 63 includes a bell mouthed tube 63' to fit over the adjacent end of the preheated blank alined therewith, and a pivoted feeler 63ᵃ to be tilted by the operator by means of a handle 191 upwardly against the blank to assist in aligning it with the tube 63'.

Carriage 61 is slidably supported on guide rod 15 by means of bearing bracket 65 and slidably supported on guide rod 17 by means of bearing bracket 66.

Rotatably journaled in carriage 61 are three equidistantly spaced longitudinally extending angularly converging roll spindles 67 between which the work arbors are successively introduced laterally (Fig. 3) each time the work holder is stepped a quarter revolution.

The roll spindles 67 are continuously driven at predetermined surface speed and in the same direction from the driven shaft 24 in any suitable manner, as by the belt and pulley drive 68 at the left hand end of said spindles. The pulley of the belt and pulley drive 68 is splined to shaft 24.

Fast to the right hand end of each spindle is a tapered sizing roll 69. The taper of said rolls may be varied as desired but for most types of work the rolls have a taper of preferably about 10°. The angle of convergence of the roll spindles may likewise be varied as circumstances require, but in any case, the spindles should converge upon the center axis of the work arbor at a point sufficiently close to the shoulder 48 of said arbor to insure proper contact of the rolls 69 with the preheated blank throughout the entire length thereof. If desired, the surfaces of the rolls may have a relatively shallow single or multiple spiral thread cut in them to avoid unduly upsetting the softened glass through failure of the rolls to properly grip and work the same.

The burners 70 and 70' for producing the intense flame necessary to soften the glass blank are preferably mounted to travel with the carriage 61 along the length of the blank as the carriage makes its working stroke. Such burners may burn a mixture of gas and oxygen. Preferably, the gas burns continuously, but the oxygen is supplied intermittently, being controlled by poppet valves 71 and 71' which are automatically turned on and off at the beginning and end of the working stroke of the carriage 61.

To accomplish this, I provide at the rear of the machine a fixed cam comprising a pair of alined oppositely inclined surfaces 72 and 73 (Fig. 1) between which is a depressed or dwell portion 74. Operating back and forth over said cam is a spring tensioned cam roll 75 moving with the carriage 61.

Cam roll 75 is mounted on an arm 76 (Figs. 6 and 7) and said arm is connected to a forked arm 77 pivoted on rod 78 and engaging poppet valve 71. Extending between forked arm 77 is one end of a lever 79 which is pinned between its ends on rod 80 and carrying a cam roller 81. Also pinned to rod 80 is a second arm 82 engaging poppet valve 71'. Inasmuch as arms 82 and 79 are both pinned to the rod 80 it results that both valves 71 and 71' will be simultaneously actuated.

Cam roll 81 rides on cam 83 fast on cam shaft 84, which shaft has fixed to its outer end a crank arm 86. Fast to said crank arm is a lever 85. Crank arm 86 is spring tensioned as at 87, and carrying at its lower end a pin 88 which strikes against the end of a rod 89 (Fig. 2) fixed on tie rod 15 when the carriage 61 reaches the limit of its forward stroke and thereby throws lever 85 clockwise to shut off both poppet valves 71 and 71' through the above-described connections.

Fixed to the back of cam 83 is a pin 90 (Fig. 8) working in an elongated slot 91 in a pawl 92. Pawl 92 has a tooth 93 for engagement with and disengagement from the continuously rotating sprocket chain 29, and is pivoted to swing about stud 94 as an axis. Spring 95 anchored at its ends to stud 94 and cam 83 tends to hold tooth 93 in engagement with chain 29.

In order to permit the preheated glass blank to be introduced between the rolls 69 to be acted on thereby when the carriage 61 begins its working stroke and to be withdrawn from between said rolls when the carriage has completed its working stroke, I provide mechanism for imparting limited reciprocating movement to the roll spindles relative to the carriage.

Such mechanism may conveniently take the form of a pressure cylinder 96 (Fig. 6) mounted on and traveling with the carriage. Pressure to operate said cylinder is supplied thereto through pipe 97 connecting with reservoir 98. Arm 85, through suitable linkage indicated generally at 85' in Fig. 3, operates a relief valve 96' for cylinder 96.

Fastened to the outer end of the piston 99 of the air cylinder is a crank arm 100 spring tensioned as at 101 (Fig. 2). Crank arm 100 is fast to a crank 102 at the upper end of a vertically journaled crank shaft 103. Fast to the lower end of crank shaft 103 is a pinion 104 (Fig. 5) meshing with the rack teeth 105 of a carriage shifter member 106 which is mounted for limited sliding movement longitudinally within the carriage 61. The shifter 106 is preferably of tubular form (see Fig. 4) and has fixed to its outer end three equidistantly spaced shifting forks 107 which respectively straddle flanged shifting collars 108 on the roll spindles.

When the carriage 61 completes its working stroke, the operator first moves bodily by hand the end-pressure head 63 to the right until it contacts a fixed stop 109 (Fig. 2) adjustably mounted on guide rod 22. Pivoted to stop 109 is a latch 110 for latching the head 63 in retracted position. With the head thus retracted and latched, the operator grasps lever 62 and swings it to the left in Fig. 1 a distance sufficient to carry the rolls 69 beyond the sized blank on the arbor so that said blank and arbor will clear said rolls when the work holder is swung by means of hand lever 19 to its inoperative position.

After the operator has moved the work holder to said position, she now withdraws the sized and cooled blank B from its arbor and replaces it with a new blank, after which she manually steps the work holder one-quarter turn ahead clockwise, and by means of hand lever 19 swings it back to operating position.

The operator next unlatches the end-pressure head 63 and bodily slides it to the left until its cupped end 63' engages the outer end of the blank on the arbor alined therewith. The pivoted feeler 63ª may be manually tilted by the operator at this time to lift the outer end of the blank into alignment with said cupped end 63'. The lever 85 controlling piston 99 is now manually thrown to the left in Fig. 2 to thereby (1) re-engage carriage 61 with the sprocket feed chain, (2) open oxygen supply valves 71 and 71', and (3) slide roll spindles 67 along their bearings a distance sufficient to bring rolls 69 into driving contact with the blank B² on arbor.

From the foregoing description, it is evident that the combined action of the sizing rolls, traveling burners, rotating arbor and end-pressure device is to cause the softened glass to contract against the arbor and expand against the sizing rolls in relatively narrow zones which progressively merge with each other along the length of the blank as the sizing rolls and burners traverse the blank until the entire length of the tube is brought uniformly to the required inside and outside dimensions.

In Figs. 10 and 11, a blank B⁴ of originally relatively large outside diameter is shown as being progressively changed to the definite outside diameter as determined by the setting of the sizing rolls.

In Figs. 12 and 13 a blank B⁵ of originally relatively smaller diameter than blank B⁴ is shown as being progressively changed to the definite outside diameter as determined by the setting of the sizing rolls.

When completed the inside diameter of each tube will be the same as the outside diameter of its arbor, and if the setting of the sizing rolls was the same in each instance, both tubes will have the same outside diameter, even though the original blanks were of different outside diameters.

By specially shaping the sizing rolls, tubes may be produced which have different wall thicknesses in different areas thereof, or special flanges or the like.

Various modifications in the machine may be resorted to within the spirit and scope of my invention as defined by the appended claims.

What I therefore claim and desire to secure by Letters Patent is:

1. A machine for presizing glass tubing, comprising a frame, a carriage slidable longitudinally on said frame through a working stroke, a plurality of sizing rolls journalled in said carriage and so spaced relative to each other as to be externally tangent to a circle of the wanted diameter of the blank, said rolls each having a blank engaging portion, means for rotating said rolls at predetermined surface speed, an arbor support mounted on said frame, an arbor of the diameter wanted for the inside of the finished tube centered by the arbor support between said rolls so as to be frictionally rotated thereby, said arbor having a stop against which one end of a blank supported on said arbor is adapted to abut, means carried by said roll carriage for applying a locally concentrated softening flame to the blank on said arbor at a point beginning adjacent said stop and progressively traversing said blank towards the other end during the working stroke of the carriage, and means continuously pressing against the other end of the blank to urge the blank against said stop and thereby force the glass as it is softened into contact with said arbor and the blank engaging portions of said rolls during the working stroke of the carriage.

2. The machine of claim 1, said end pressure means being longitudinally slidable on said frame through a working stroke in the opposite direction to that of the working stroke of the carriage.

3. The machine of claim 1, in which the axis of each sizing roll is disposed at an angle to the arbor and each roll is movable along its axis relative to the carriage to have an operative position and an inoperative position with relation to the arbor, and means for moving the rolls into their operative position at the beginning of the working stroke of the carriage.

4. The machine of claim 1, in which the axis of each sizing roll is disposed at an angle to the arbor and each roll is movable along its axis relative to the carriage to have an operative position and an inoperative position with relation to the arbor, and means for moving the rolls into their operative position at the beginning of the working stroke of the carriage, said means comprising a shaft, a pressure-operable element for rotating said shaft in one direction, a hand lever for controlling the supply of pressure to said pressure-operable element, a roll-shifter slidable with reference to said carriage, and motion-transmitting connections between said shaft and said roll-shifter.

5. A machine for presizing glass tubing, comprising a frame, a carriage slidable longitudinally on said frame through a working stroke, a plurality of sizing rolls journalled in said carriage, and so spaced relative to each other as to be externally tangent to a circle of the wanted diameter of the blank, said rolls each having a blank engaging portion, means for rotating said rolls at predetermined surface speed, an indexing work holder pivoted to said frame to swing from an operating to a non-operating position and vice versa relative thereto, a plurality of radially spaced blank supporting arbors mounted on said work holder to be successively centered between and rotated by said rolls whenever the work holder is indexed one step ahead and swung to operating position, each arbor being of the diameter wanted for the inside of the finished tube and having a stop against which one end of a blank supported on it is adapted to abut, means carried by said roll carriage for applying a locally concentrated softening flame to the blank on said arbor at a point beginning adjacent said stop and progressively traversing said blank towards the other end during the working stroke of the carriage, and means continuously pressing against the other end of the blank to urge the blank against said stop and thereby force the glass as it is softened into contact with said arbor and the blank engaging portions of said rolls during the working stroke of the carriage.

6. The machine of claim 5, and a relatively stationary preheating burner carried by said work holder for preheating a blank on one of said arbors.

7. The machine of claim 5, and a relatively stationary preheating burner carried by said work holder for preheating a blank on one of said arbors, and independent means for rotating that arbor and blank of the work holder which is being preheated.

8. A machine for presizing glass tubing, comprising a frame, a carriage slidable longitudinally on said frame through a working stroke, a plurality of sizing rolls journalled in said carriage, and so spaced relative to each other as to be externally tangent to a circle of the wanted diameter of the blank, said rolls each having a blank engaging portion, means for rotating said rolls at predetermined surface speed, an arbor support mounted on said frame, an arbor of the diameter wanted for the inside of the finished tube centered by the arbor support between and frictionally rotated by said rolls, said arbor having a stop against which one end of a blank supported on said arbor is adapted to abut, a pair of burners carried by said roll carriage for applying a locally concentrated softening flame to the blank on said arbor at a point beginning adjacent said stop and progressively traversing said blank towards the other end during the working stroke of the carriage, and means continuously pressing against the other end of the blank to urge the blank against said stop and thereby force the glass as it is softened into contact with said arbor and the blank engaging portions of said rolls during the working stroke of the carriage, a valve in control of one of said burners, and cam-operated means to open and close said valve at the beginning and end of said working stroke.

9. In a machine for presizing glass tubing, a rotatably mounted blank supporting arbor including a stop portion against which one end of a blank on said arbor abuts, a support, a burner, and a plurality of sizing rolls mounted on said support in radially spaced relation to said arbor to define the external diameter of the finished article, means to rotate said rolls to effect rotation of the blank and arbor, means to move said support longitudinally relative to said arbor while said rolls are being rotated, whereby the glass is progressively softened beginning at a zone adjacent said stop portion, and means continuously pressing against the opposite end of said blank to urge it against said stop portion and thereby force the glass as it is softened into contact with said sizing rolls and said arbor.

10. The machine of claim 9, in which each roll has an arbor-rotating portion and the arbor has a portion engageable therewith.

11. The machine of claim 9, in which the support is a carriage slidably supported upon the machine to have axial movement relative to the stop portion of the arbor.

JESSE CONRAD SMITH.